(12) United States Patent
Ardanese et al.

(10) Patent No.: US 8,484,955 B2
(45) Date of Patent: Jul. 16, 2013

(54) SYSTEM AND METHOD FOR ESTIMATING AN AMOUNT OF PARTICULATE MATTER ACCUMULATED IN A PARTICULATE FILTER

(75) Inventors: Raffaello Ardanese, Troy, MI (US); Rebecca J. Darr, Milford, MI (US); Michelangelo Ardanese, Ann Arbor, MI (US); Paul Jasinkiewicz, Northville, MI (US); Christopher Whitt, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 350 days.

(21) Appl. No.: 13/020,859

(22) Filed: Feb. 4, 2011

(65) Prior Publication Data
US 2012/0198820 A1    Aug. 9, 2012

(51) Int. Cl.
  F01N 3/00   (2006.01)
  F01N 3/02   (2006.01)
  G01N 7/00   (2006.01)
  G01N 33/497 (2006.01)
  G01N 37/00  (2006.01)

(52) U.S. Cl.
  USPC ............... 60/295; 60/274; 60/311; 73/23.33; 73/28.01

(58) Field of Classification Search
  USPC ........... 60/274, 276, 295, 297, 311; 73/23.33, 73/28.01, 865
  See application file for complete search history.

(56) References Cited

U.S. PATENT DOCUMENTS

| | | | |
|---|---|---|---|
| 2005/0137776 A1* | 6/2005 | Gioannini et al. | 701/101 |
| 2008/0155964 A1* | 7/2008 | Kilkenny | 60/286 |
| 2009/0320452 A1* | 12/2009 | Gioannini et al. | 60/277 |
| 2012/0174652 A1* | 7/2012 | Jasinkiewicz et al. | 73/23.33 |

* cited by examiner

Primary Examiner — Kenneth Bomberg
Assistant Examiner — Audrey K Bradley
(74) Attorney, Agent, or Firm — Quinn Law Group, PLLC (57) ABSTRACT

An amount of particulate matter accumulated in a particulate filter of an exhaust system is estimated by preloading a memory location with a plurality of hybrid models. Each hybrid model estimates an amount of particulate matter accumulated in the particulate filter between a pair of operating points. An estimated amount of particulate matter accumulated in the particulate filter is stored in the memory location for each hybrid model. Each hybrid model is ranked based on estimation accuracy during operating conditions and the highest ranked hybrid model is selected. The estimated amount of particulate matter accumulated in the particulate filter corresponding to the highest ranked hybrid model is added to the soot estimation value stored in the memory location that corresponds to a ranked hybrid model to provide a soot estimation value of a cumulative estimated amount of particulate matter contained in the particulate filter for the ranked hybrid model.

20 Claims, 3 Drawing Sheets

*Figure 3*

SYSTEM AND METHOD FOR ESTIMATING AN AMOUNT OF PARTICULATE MATTER ACCUMULATED IN A PARTICULATE FILTER

TECHNICAL FIELD

A system and method generally relates to estimating an amount of particulate matter accumulated in a particulate filter of an exhaust system.

BACKGROUND

An exhaust system for a vehicle may include a particulate filter. If the engine is a diesel engine, then the particulate filter is referred to as a diesel particulate filter. The particulate filter traps particulate matter, i.e., soot, from the exhaust gas of the engine. The particulate filter may include one or more substrates that define a plurality of apertures, through which the exhaust gas must flow. The particulate matter collects on the substrate as the exhaust gas flows through the apertures. The particulate filter is occasionally regenerated to remove the collected particulate matter from the substrate. Regeneration of the particulate filter includes heating the particulate filter to a temperature sufficient to burn the collected particulate matter. The burnt particulate matter is converted to carbon dioxide that dissipates into the atmosphere.

A soot module may be employed to estimate and predict soot accumulation within the particulate filter to assist in determining when the particulate filter is required to be regenerated. When the module estimates that the soot accumulation has reached a predefined threshold, the particulate filter may be regenerated.

SUMMARY

A method of estimating an amount of particulate matter accumulated in a particulate filter of an exhaust system includes initializing a control processor, including preloading a memory location with a plurality of hybrid models. Each of the plurality of hybrid models is configured to estimate an amount of particulate matter accumulated in the particulate filter between a pair of operating points, as a function of at least one operating condition. A soot estimation value that corresponds to an estimated amount of particulate matter accumulated in the particulate filter is temporarily stored in the memory location. At one of the pair of operating points, an amount of particulate matter accumulated in the particulate filter between the pair of operating points for each of the plurality of hybrid models is estimated. Each of the estimated amounts of particulate matter accumulated in the particulate filter between the pair of operating points are added, via the control processor, to the soot estimation values stored in the corresponding memory location for each of the plurality of hybrid models to provide a soot estimation value of a cumulative estimated amount of particulate matter contained in the particulate filter for each of the plurality of hybrid models. One of the plurality of hybrid models is selected. The estimated amount of particulate matter accumulated in the particulate filter between the pair of operating points of the selected one of the plurality of hybrid models is added to the soot estimation value stored in the memory location that corresponds to a ranked hybrid model to provide a soot estimation value of a cumulative estimated amount of particulate matter contained in the particulate filter for the ranked hybrid model.

A method of estimating an accumulation of particulate matter in a particulate filter operatively connected to an engine of a vehicle includes operating the engine. A control processor is initialized, including preloading a memory location with a plurality of hybrid models. Each of the plurality of hybrid models is configured to estimate an amount of particulate matter accumulated in the particulate filter between a pair of operating points of the engine, as a function of at least one operating condition of the engine, the exhaust system, or the vehicle. The method further includes temporarily storing in the memory location a soot estimation value corresponding to an estimated amount of particulate matter accumulated in the particulate filter and estimating, at one of the pair of operating points, an amount of particulate matter accumulated in the particulate filter between the pair of operating points for each of the plurality of hybrid models. Each of the estimated amounts of particulate matter accumulated in the particulate filter between the pair of operating points is added to the soot estimation values stored in the corresponding memory location for each of the plurality of hybrid models to provide a soot estimation value of a cumulative estimated amount of particulate matter contained in the particulate for each of the plurality of hybrid models. One of the plurality of hybrid models is selected and the estimated amount of particulate matter accumulated in the particulate filter between the pair of operating points of the selected one of the plurality of hybrid models is added to the soot estimation value stored in the memory location that corresponds to a ranked hybrid model to provide a soot estimation value of a cumulative estimated amount of particulate matter contained in the particulate filter for the ranked hybrid model.

A vehicle includes an engine, an exhaust system, and a particulate estimation system. The exhaust system includes a particulate filter that is operatively connected to the engine and that is configured for collecting particulate matter exhausted from the engine. The particulate estimation system is configured for estimating a mass of particulate matter accumulated in the particulate filter. The particulate estimation system includes a memory device configured for storing at least one soot estimation value and a plurality of hybrid models and a control processor. The control processor is operable for preloading a memory location with a plurality of hybrid models. Each of the plurality of hybrid models is configured to estimate an amount of particulate matter accumulated in the particulate filter between a pair of operating points of the engine, as a function of at least one operating condition of the engine, the exhaust system, or the vehicle. A soot estimation value corresponding to an estimated amount of particulate matter accumulated in the particulate filter is temporarily stored in the memory location. At one of the pair of operating points, an estimation is made as to an amount of particulate matter accumulated in the particulate filter between the pair of operating points for each of the plurality of hybrid models. Each of the estimated amounts of particulate matter accumulated in the particulate filter between the pair of operating points is added to the soot estimation values stored in the corresponding memory location for each of the plurality of hybrid models to provide a soot estimation value of a cumulative estimated amount of particulate matter contained in the particulate filter for each of the plurality of hybrid models. One of the plurality of hybrid models is selected. The estimated amount of particulate matter accumulated in the particulate filter between the pair of operating points of the selected one of the plurality of hybrid models is added to the soot estimation value stored in the memory location that corresponds to a ranked hybrid model to provide a soot estimation value of a cumulative estimated amount of particulate matter contained in the particulate filter for the ranked hybrid model.

The above features and advantages and other features and advantages of the present invention are readily apparent from the following detailed description of the best modes for carrying out the invention when taken in connection with the accompanying drawings.

DETAILED DESCRIPTION

Figure 1:
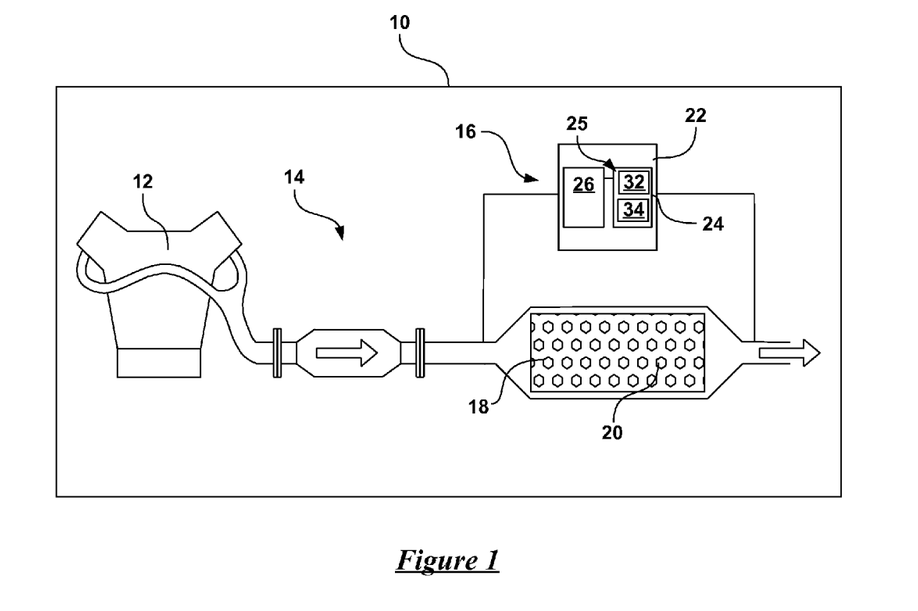
FIG. 1 is a schematic diagram of vehicle including an engine and an exhaust system having a particulate filter and a particulate estimation system configured for estimating an amount of particulate matter accumulated in the particulate filter.

Referring to FIG. 1, wherein like numerals indicate like parts throughout the several views, a vehicle is shown generally at 10. The vehicle 10 includes an engine 12, an exhaust system 14, and a particulate estimation system 16.

The exhaust system 14 directs and treats exhaust gas from the engine 12. The exhaust system 14 includes a particulate filter 18 that is operatively connected to the engine 12. The particulate filter 18 is configured to filter particulate matter, i.e., soot, exhausted from the engine 12. The engine 12 may be a diesel engine, a gasoline engine, or any other engine which produces particulate matter during a combustion process. The particulate filter 18 may include one or more substrates 20 that define a plurality of apertures, through which the exhaust gas must flow. The particulate matter collects on the substrate 20 as the exhaust gas flows through the apertures. The particulate filter 18 is occasionally selectively cleaned or regenerated to remove the collected particulate matter from the substrate 20. Regeneration of the particulate filter 18 includes heating the particulate filter 18 to a temperature sufficient to burn the collected particulate matter. The burnt particulate matter is converted to carbon dioxide that dissipates into the atmosphere.

The particulate estimation system 16 is configured for estimating a mass of particulate matter accumulated in the particulate filter 18. The particulate estimation system 16 includes a control processor 22 having a memory device 24 and a controller 26. The memory device 24 is configured for storing at least one soot estimation value and a plurality of hybrid models 32 in a memory location 25, as described in more detail below. The hybrid models 32 are selectively accessible by the control processor 22.

In general, computing systems and/or devices, such as the control processor 22, may employ any of a number of computer operating systems and generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Each of the plurality of hybrid models 32 may include one or more modules. Each module may be an algorithm that is executed by the controller 26 to calculate an estimated amount of particulate matter accumulated in the particulate filter 18 between operating points 28, 30 of the engine 12, based on one or more operating conditions of the engine 12, the vehicle 10, and/or the exhaust system 14. Each module is configured to uniquely estimate an amount of the particulate matter accumulated within the particulate filter 18 over a period of time or mileage to assist in the determination of when to regenerate the particulate filter 18. These modules may be of the type generally known in the art. Each module measures the theoretical accumulation of soot in the particulate filter 18 based on input signals associated with that specific module. The input signals are a function of one or more operating conditions. Examples of the operating conditions may include, but are not limited to, altitude, vehicle speed, engine speed, engine load, temperature, and the like. The modules may be any type of module, as known to those skilled in the art. The soot estimate from the modules are ranked based on the evaluation of the input signals as a function of various operating conditions. One or more of the modules may then be combined to form a plurality of different hybrid models 32. Each hybrid model 32 is then ranked based on the ranking of the input modules, which make up each of the individual hybrid models 32. Ranking may be performed on each of the hybrid models 32 to rank the soot estimation accuracy, i.e., the accuracy of the prediction of the rate at which particulate matter is accumulating or the accuracy of the prediction of the amount of particulate matter that has accumulated in the particulate filter 18, at various different operating conditions or input signals. This means that the hybrid models 32 are tightly connected to their specific input signal. For example while one hybrid model 32 may be more accurate at altitudes above 5,000 feet, another hybrid model 32 may be more accurate at engine speeds exceeding 3,000 revolutions per minute (RPM). Therefore, as the engine 12 operates, different hybrid models 32 may be more accurate between different operating points 28, 30 of the engine 12 and/or vehicle 10.

Figure 2:
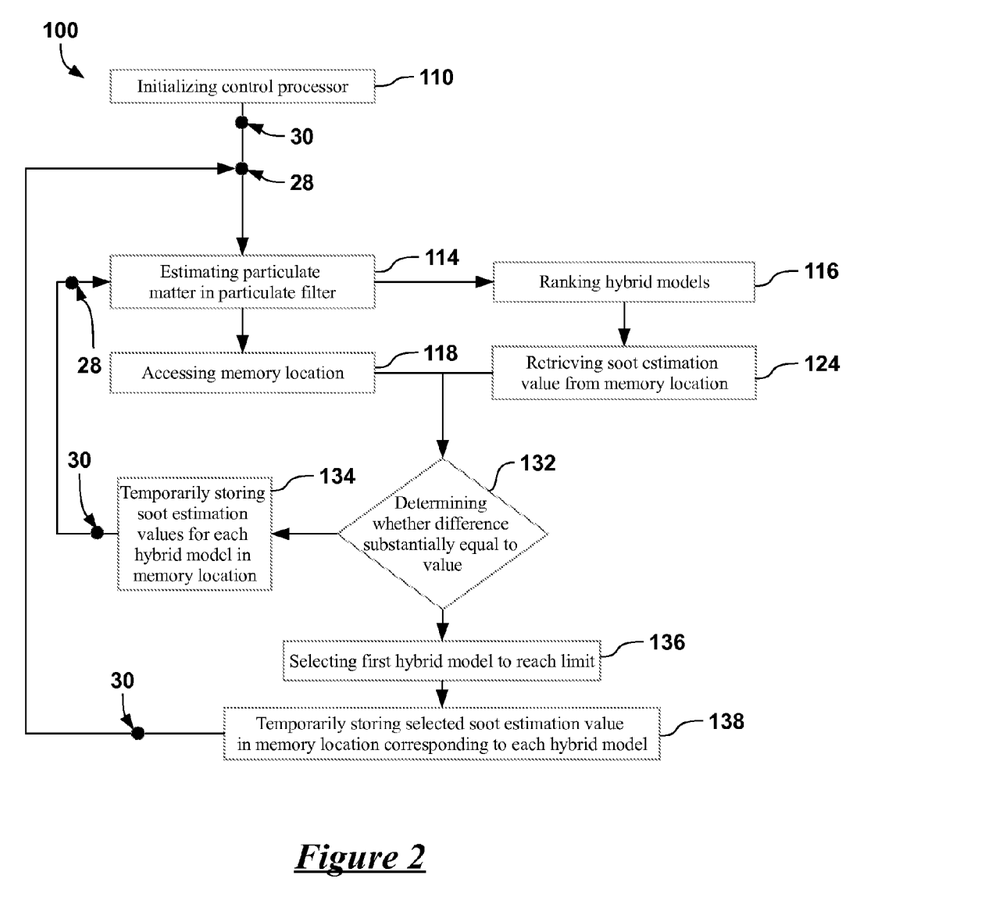
FIG. 2 is a schematic flow chart diagram of a method for estimating the amount of particulate matter accumulated in the particulate filter, such as that shown in FIG. 1.
Figure 3:
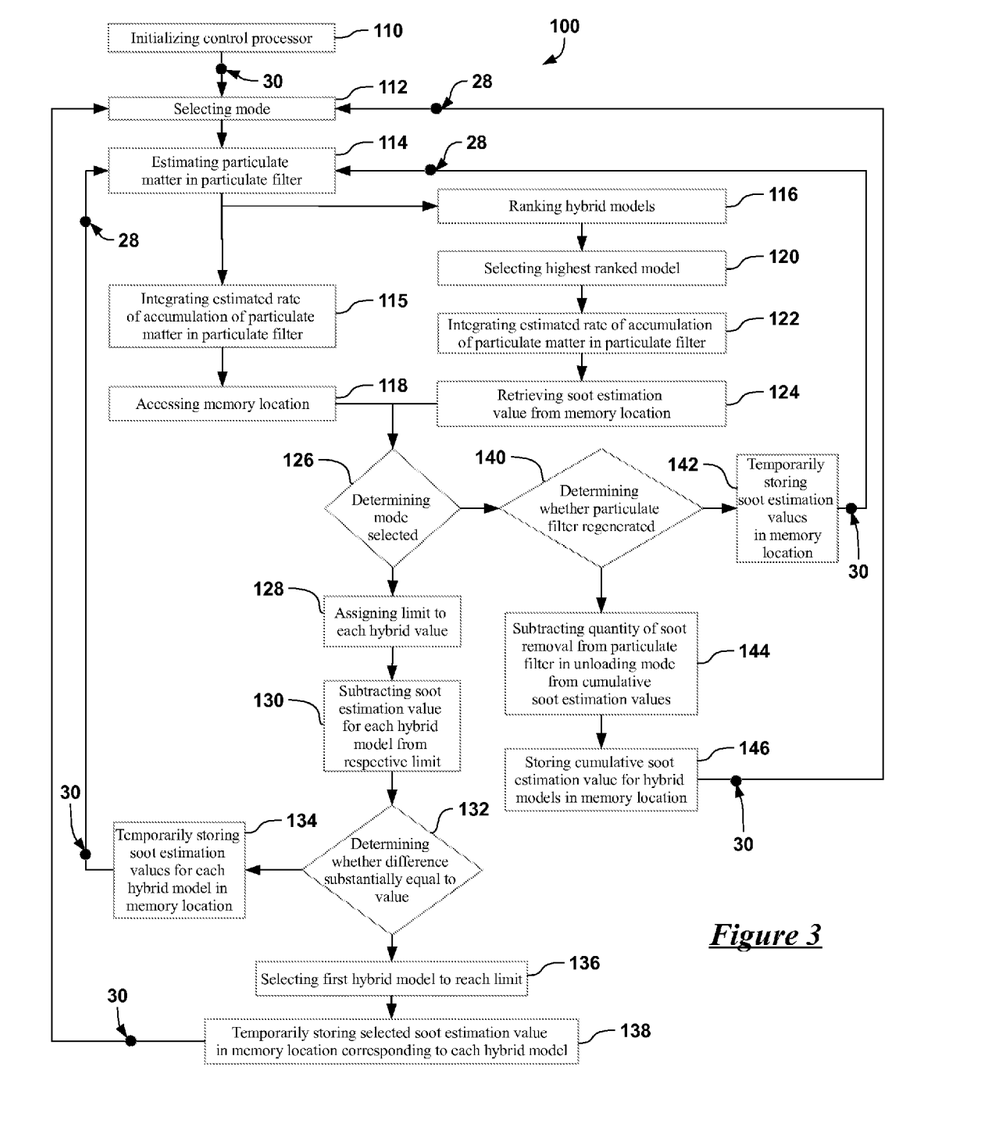
FIG. 3 is another schematic flow chart diagram of a method for estimating the amount of particulate matter accumulated in the particulate filter, such as that shown in FIG. 1.

Referring to FIGS. 2 and 3, the controller 26 is operable for executing a method 100 to estimate the accumulation of particulate matter in the particulate filter 18 of the exhaust system 14 during engine 12 operation. More specifically, the method 100 is configured to estimate the accumulation of particulate matter in the particulate filter 18 during normal engine 12 operation, i.e., a loading mode, and during engine 12 operation when regenerating of the particulate filter 18, i.e., an unloading mode. Since each hybrid model 32 is tightly linked to one or more operating conditions, the accuracy of each hybrid model 32 needs to be considered when estimating the accumulation of particulate matter in the particulate filter 18. Additionally, during regeneration of the particulate filter 18, the engine 12 may be much less efficient in combusting the fuel, which results in a decrease in fuel economy. Accordingly, the particulate matter accumulated in the particulate filter 18 may be more accurately estimated using different sets of hybrid models 32, i.e., unloading models of the unloading mode, as opposed to when the vehicle 10 is in the loading mode.

Referring again to FIGS. 2 and 3, the method 100 includes initializing the control processor 22 at step 110, which may include preloading the memory location 25 with the plurality of the hybrid models 32 and a soot estimation value associated with each of the hybrid models 32. The soot estimation value is the estimated quantity of particulate matter in the particulate filter 18. When preloading the memory location 25 with the soot estimation value, the value may be zero if the particulate filter 18 has not been previously exposed to particulate matter. The plurality of hybrid models 32 may be associated with the loading mode and/or the unloading mode. As described above, each hybrid model 32 is configured to estimate an amount of particulate matter accumulated in the particulate filter 18 between operating points 28, 30, as a function of at least one operating condition. The operating points 28, 30 may be time increments, i.e., every 0.5 milliseconds (ms) and the like. However, other operating points, as known to those skilled in the art may also be used.

Referring to FIG. 3, at step 112, the loading mode or the unloading mode is selected in order to determine which of the plurality of hybrid models 32 are to be used. The loading mode or the unloading mode may be selected by the controller 26.

Referring again to FIGS. 2 and 3, when the engine 12 operates and an operating point 28 is achieved, an estimation is made as to the amount of particulate matter accumulated in the particulate filter 18 between the achieved operating point 28 and a previous operating point 30 at step 114. The estimation may be made by the controller 26 by executing the algorithms associated with each of the hybrid models 32, as a function of the operating conditions. Therefore, if there are six hybrid models 32, for example, the controller 26 will generate six separate corresponding estimations.

Referring to FIG. 3, the amount of particulate matter being accumulated in the particulate filter 18 may be measured by the control processor 22 as a flow rate, i.e., grams per second (g/s) and/or as a mass, i.e., grams (g). It should be appreciated that the soot rate may represent a positive or a negative rate of accumulation. When the accumulation of particulate matter is being estimated by the controller 26 as a rate, at step 115, the control processor 22 integrates the estimated rate of accumulation of particulate matter in the particulate filter 18 for each of the hybrid models 32 to provide an estimated amount of mass of particulate matter accumulated in the particulate filter 18 between the operating points 28, 30 for each of the plurality of hybrid models 32. Additionally, the amount of particulate matter accumulated in the particulate filter 18 can also be evaluated in terms of total amount, i.e., mass accumulated in the particulate filter 18, instead of being evaluated in terms of the flow rate of accumulation.

Referring again to FIGS. 2 and 3, the controller 26 accesses the memory location 25 at step 118 to determine the temporarily stored soot estimation value associated with each hybrid model 32 that was attained at the previous operating point 30. This stored soot estimation value is stored as a mass. If the engine 12 has not previously operated, the temporary soot estimation value will be the soot estimation value preloaded in the memory location 25. If, however, the engine 12 has previously operated, the previous operating point 30 will be an operating point associated with the soot estimation values temporarily stored in the memory location 25 for each of the plurality of hybrid models 32. The temporarily stored soot estimation values that were retrieved from the memory location at step 118 are added to the estimated amount of mass of particulate matter accumulated in the particulate filter 18 between the operating points 28, 30 for each of the plurality of hybrid models 32, as determined during the integration step 115, to provide cumulative soot estimation values of the total estimated amount of particulate matter accumulated in the particulate filter 18 for each of the plurality of hybrid models 32.

Referring to FIG. 3, at step 116, each of the plurality of hybrid models 32 are ranked based on the soot estimation accuracy of each hybrid model 32 between the previous pair of operating points 28, 30. As discussed above, the accuracy of each hybrid model 32 is a function of the operating conditions. The accuracy of each hybrid model 32, which is a function of one or more operating conditions, may be input into the control processor 22 during the initialization step 110. Ranking each of the plurality of hybrid models 32 will allow for the creation of a ranked hybrid model 34 that incorporates the soot estimation value associated with the highest ranked hybrid model 34. Therefore, the ranked hybrid model 34 may provide the most accurate soot estimation value.

To create the ranked hybrid model 34, at step 120, the highest ranked model is selected, as shown in FIGS. 2 and 3. The selection may be made by the controller 26. It should be appreciated that the selection may also be made in any other way known to those skilled in the art. Therefore, the hybrid model 32 having the highest ranking between the achieved or current operating point 28 and the previous operating point 30, i.e., the most accurate, is selected by controller 26 to create or modify the ranked hybrid model 34.

At step 122, when the accumulation of particulate matter is being estimated by the controller 26 at step 114 as a rate, the control processor 22 integrates the estimated rate of accumulation of particulate matter in the particulate filter 18 between the operating points 28, 30 for the selected highest ranked model 32. Additionally, the amount of particulate matter accumulated in the particulate filter 18 an also be evaluated in terms of total amount, i.e., mass accumulated in the particulate filter 18, instead of being evaluated in terms of the flow rate of accumulation.

The controller 26 retrieves the soot estimation value from the memory location 25 at step 124 to determine the previously stored soot estimation value associated with the ranked hybrid model 34. If the engine 12 has not previously operated, the soot estimation value for the ranked hybrid model 34 will be the soot estimation value preloaded in the memory location 25. If, however, the engine 12 has previously operated, the previous operating point 30 will be an operating point associated with the soot estimation value temporarily stored in the memory location 25 for the ranked hybrid model 34. The temporarily stored soot estimation value is added via the controller 26 to the soot estimation value corresponding to the achieved operating point 28 for the selected, i.e., highest ranked, hybrid model 32 to provide a cumulative soot estimation value of the total estimated amount of particulate matter accumulated in the particulate filter 18 for the ranked hybrid model 34. It should be appreciated that the controller 26 may be a different controller 26 or the addition may be implemented in any other way, as known to those skilled in the art.

Referring to FIG. 3, once the cumulative soot estimation values for each of the plurality of hybrid models 32 and the ranked hybrid model 34 are attained at steps 118 and 124, respectively, a determination is made at step 126 as to whether the loading mode or the unloading mode was previously selected at step 112.

If the loading mode was selected, a limit may be assigned to each of the plurality of hybrid models 32 at step 128. Each hybrid model 32 may have a dynamic limit that is a function of at least one operating condition of the engine 12. An algorithm may be used to vary the limits dynamically as the engine 12 and/or vehicle 10 and/or the exhaust 14 operates. Conversely, the ranked hybrid model 34 may have a static or a fixed limit, i.e., 44 grams, as a non-limiting example, that does not change as the engine 12 and/or vehicle 10 and/or the exhaust 14 operates. The fixed limit for the ranked hybrid model 34 may be stored in the memory location 25 at step 110. It should be appreciated that the static limit may be selectively varied within the memory location 25, as desired, when preloading the memory location 25. Additionally, it should also be appreciated that the limits for each of the hybrid models 32 and the ranked hybrid model 34 may be set and/or varied in other ways, as known to those skilled in the art.

In order to determine whether one of the plurality of hybrid models 32 or the ranked hybrid model 34 has reached the respective limit, the soot estimation value for each of the plurality of hybrid models 32 and the ranked hybrid model 34 may be subtracted from the respective limit by the controller 26 to determine a difference that corresponds to each of the plurality of hybrid models 32 and the ranked hybrid model 34 at step 130.

Referring to FIGS. 2 and 3, a determination is made at step 132 as to whether the difference corresponding to any of the plurality of hybrid models 32 and the ranked hybrid model 34 is substantially equal to a value. In one embodiment, the value is substantially equal to zero. The first of the plurality of hybrid models 32 or the ranked hybrid model 34 to reach the value means that the respective limit has been reached.

If it is determined that none of the plurality of hybrid models 32 or the ranked hybrid model 34 is substantially equal to the respective limit at step 132, the respective soot estimation values for each of the plurality of hybrid models 32 and the ranked hybrid model 34 are temporarily stored in the memory location 25 at step 134 as the temporarily stored soot estimation values that correspond to the previous operating point 30. Steps 114-132 are repeated until the limit is reached by one of the plurality of hybrid models 32 or the ranked hybrid model 34.

The first of the plurality of hybrid models 32 or the ranked hybrid model 34 to reach the respective limit is selected at step 136 as providing the most accurate soot estimation value between the previous pair of operating points 28, 30. The selection may be made by the controller 26. However, it should be appreciated that the selection may be made in any other way, as known to those skilled in the art.

The selected one of the plurality of hybrid models 32 and the ranked hybrid model 34 has a respective selected soot estimation value. At step 138, the selected soot estimation value is temporarily stored in the memory location 25 that corresponds to each of the plurality of hybrid models 32 and the ranked hybrid model 34 to be used as an initial soot estimation value during the unloading mode, explained in more detail below.

Referring to FIG. 3, when the limit is achieved by one of the plurality of hybrid models 32 or the ranked hybrid model 34 at step 132, the particulate filter 18 is considered to be full of particulate matter such that regeneration is required. When the limit is reached, it is time for the particulate filter 18 to be cleaned or "unloaded" and the unloading mode is selected at step 112. The selection of the unloading mode at step 112 may be made by the controller 26. However, it should be appreciated that the unloading mode may be selected in any other way, as known by those skilled in the art.

The method of determining the soot estimation values for steps 114-124 during the unloading mode are the same, whether the loading mode or the unloading mode has been selected at step 112, as shown in FIGS. 2 and 3. The only difference is the plurality of hybrid models 32 that are used to make the estimation. However, at step 126 in FIG. 3, when the determination is made that the unloading mode was selected at step 112, step 140 is initiated. Step 140 determines whether the engine 12 has operated a duration to regenerate the particulate filter 18. The duration may be a predetermined amount of time, mileage, amount of soot or particulate matter burned, or any other duration known to those skilled in the art.

If it is determined at step 140 that the duration has not been achieved, step 142 is initiated and the respective soot estimation values for each of the plurality of hybrid models 32 and the ranked hybrid model 34 are temporarily stored in the memory location 25 at step 142. Steps 114-126 and 140 are repeated until it is determined that the duration has been reached.

When it is determined at step 140 that the duration has been reached, step 144 is initiated. In step 144, a determined quantity of soot removed from the particulate filter 18 during regeneration in the unloading mode is subtracted from the cumulative soot estimation values for each of the plurality of hybrid models 32 and the ranked hybrid model 34 that were stored in the memory location 25 at step 142 or preloaded in the memory location 25 at step 110 to provide a new cumulative soot estimation value for each of the plurality of hybrid models 32 and the ranked hybrid model 34.

The new cumulative soot estimation value for each of the plurality of hybrid models 32 and the ranked hybrid model 34 are stored in the memory location 25 at step 146.

While the best modes for carrying out the invention have been described in detail, those familiar with the art to which this invention relates will recognize various alternative designs and embodiments for practicing the invention within the scope of the appended claims.

The invention claimed is:

1. A method of estimating an amount of particulate matter accumulated in a particulate filter of an exhaust system, the method comprising:
   initializing a control processor, including preloading a memory location with a plurality of hybrid models;
   wherein each of the plurality of hybrid models is configured to estimate an amount of particulate matter accumulated in the particulate filter between a pair of operating points, as a function of at least one operating condition;
   temporarily storing in the memory location a soot estimation value corresponding to an estimated amount of particulate matter accumulated in the particulate filter;

estimating, at one of the pair of operating points, an amount of particulate matter accumulated in the particulate filter between the pair of operating points for each of the plurality of hybrid models;

adding, via the control processor, each of the estimated amounts of particulate matter accumulated in the particulate filter between the pair of operating points to the soot estimation values stored in the corresponding memory location for each of the plurality of hybrid models to provide a soot estimation value of a cumulative estimated amount of particulate matter contained in the particulate filter for each of the plurality of hybrid models;

selecting one of the plurality of hybrid models;

adding the estimated amount of particulate matter accumulated in the particulate filter between the pair of operating points of the selected one of the plurality of hybrid models to the soot estimation value stored in the memory location that corresponds to a ranked hybrid model to provide a soot estimation value of a cumulative estimated amount of particulate matter contained in the particulate filter for the ranked hybrid model; and regenerating the particulate filter based on one of the plurality of hybrid models and the ranked hybrid model.

2. A method, as set forth in claim 1, wherein estimating an amount of particulate matter accumulated in the particulate filter between the pair of operating points for each of the plurality of hybrid models is further defined as estimating a rate of accumulation of particulate matter in the particulate filter between the pair of operating points for each of the plurality of hybrid models; and integrating the estimated rate of accumulation of particulate matter in the particulate filter to provide an estimated amount of particulate matter accumulated in the particulate filter between the pair of operating points for each of the plurality of hybrid models.

3. A method, as set forth in claim 1, further comprising:

selecting one of the plurality of hybrid models and the ranked hybrid model;

wherein the selected one of the plurality of the hybrid models and the ranked hybrid model includes the corresponding cumulative soot estimation value of particulate matter accumulated in the particulate filter.

4. A method, as set forth in claim 3, further comprising temporarily storing in the memory location the soot estimation value corresponding to the selected one of the plurality of hybrid models and the ranked hybrid model.

5. A method, as set forth in claim 3, further comprising:

assigning a limit for each of the plurality of hybrid models;

assigning a limit for the ranked hybrid model;

comparing the soot estimation value of particulate matter for each of the plurality of hybrid models and the ranked hybrid model to the respective limit;

determining if one of the plurality of hybrid models and the ranked model has reached the respective limit; and wherein selecting one of the plurality of hybrid models and the ranked model is further defined as selecting the one of the plurality of hybrid models and the ranked model that is determined to be the first to reach the respective limit.

6. A method, as set forth in claim 5, wherein assigning a limit for each of the plurality of hybrid models is further defined as determining one of static and a dynamic limit for each of the plurality of hybrid models as a function of at least one of the operating conditions.

7. A method, as set forth in claim 5, wherein initializing a control processor is further defined as initializing a control processor, including at least one of preloading a memory location with a plurality of hybrid models corresponding to a loading model and preloading the memory location with a plurality of hybrid models corresponding to an unloading model.

8. A method, as set forth in claim 7, further comprising:

ranking each of the plurality of hybrid models;

wherein ranking is a function of at least one operating condition;

determining the one of the plurality of hybrid models having the highest ranking; and wherein selecting one of the plurality of hybrid models is further defined as selecting the one of the plurality of hybrid models determined to have the highest ranking.

9. A method, as set forth in claim 8, further comprising choosing one of the loading model and the unloading model;

wherein estimating, at one of the operating points, an amount of particulate matter accumulated in the particulate filter between the operating points for each of the plurality of hybrid models is further defined as estimating, at one of the operating points, an amount of particulate matter accumulated in the particulate filter between the operating points for each of the plurality of hybrid models corresponding to the chosen one of the loading model and the unloading model.

10. A method, as set forth in claim 5, further comprising temporarily storing the respective soot estimation values associated with each of the plurality of hybrid models and the ranked hybrid model in the memory location when none of the plurality of hybrid models and the ranked hybrid model has reached the respective limit.

11. A method, as set forth in claim 10, further comprising:

subtracting the sum total estimated value for each of the plurality of hybrid models and the ranked hybrid model from the respective limits to determine a difference corresponding to each of the plurality of hybrid models and the ranked hybrid model;

wherein determining if at least one of the plurality of hybrid models and the ranked hybrid model has reached the respective limit is further defined as determining if the difference corresponding to any of the plurality of hybrid models and the ranked hybrid model is substantially equal to a value; and wherein selecting the one of the plurality of hybrid models and the ranked hybrid model that is determined to be the first to reach the respective limit is further defined as selecting the one of the plurality of hybrid models and the ranked hybrid model that is determined to be the first to reach the value.

12. A method, as set forth in claim 11, wherein the value is substantially equal to zero.

13. A method, as set forth in claim 11, wherein temporarily storing the respective soot estimation values for each of the plurality of hybrid models and the ranked hybrid model in the memory location when none of the plurality of hybrid models and the ranked hybrid model has reached the respective limit is further defined as temporarily storing the respective soot estimation values for each of the plurality of hybrid models and the ranked hybrid model in the memory location when none of the plurality of hybrid models and the ranked hybrid model is substantially equal to the value.

14. A method of estimating an accumulation of particulate matter in a particulate filter operatively connected to an engine of a vehicle having an exhaust system, the method comprising:

operating the engine;

initializing a control processor, including preloading a memory location with a plurality of hybrid models;

wherein each of the plurality of hybrid models is configured to estimate an amount of particulate matter accumulated in the particulate filter between a pair of operating points of the engine, as a function of at least one operating condition of at least one of the engine, the vehicle, and the exhaust system;

temporarily storing in the memory location a soot estimation value corresponding to an estimated amount of particulate matter accumulated in the particulate filter;

estimating, at one of the pair of operating points, an amount of particulate matter accumulated in the particulate filter between the pair of operating points for each of the plurality of hybrid models;

adding each of the estimated amounts of particulate matter accumulated in the particulate filter between the pair of operating points to the soot estimation values stored in the corresponding memory location for each of the plurality of hybrid models to provide a soot estimation value of a cumulative estimated amount of particulate matter contained in the particulate filter for each of the plurality of hybrid models;

selecting one of the plurality of hybrid models;

adding the estimated amount of particulate matter accumulated in the particulate filter between the pair of operating points of the selected one of the plurality of hybrid models to the soot estimation value stored in the memory location that corresponds to a ranked hybrid model to provide a soot estimation value of a cumulative estimated amount of particulate matter contained in the particulate filter for the ranked hybrid model; and regenerating the particulate filter based on one of the plurality of hybrid models and the ranked hybrid model.

15. A method, as set forth in claim 14, further comprising:
assigning a limit for each of the plurality of hybrid models;
assigning a limit for the ranked hybrid model;
comparing the soot estimation value of particulate matter for each of the plurality of hybrid models and the ranked hybrid model to the respective limit;
determining if one of the plurality of hybrid models and the ranked model has reached the respective limit;
selecting one of the plurality of hybrid models and the ranked hybrid model;
wherein the selected one of the plurality of the hybrid models and the ranked hybrid model includes the corresponding cumulative soot estimation value of particulate matter accumulated in the particulate filter;
temporarily storing in the memory location the soot estimation value corresponding only to the selected one of the plurality of hybrid models and the ranked hybrid model when one of the plurality of hybrid models and the ranked hybrid model is determined to have reached the respective limit; and
temporarily storing the soot estimation values associated with each of the plurality of hybrid models and the ranked hybrid model in the memory location when none of the plurality of hybrid models and the ranked hybrid model has reached the respective limit.

16. A method, as set forth in claim 15, further comprising:
ranking each of the plurality of hybrid models;
wherein ranking is a function of at least one operating condition;
determining the one of the plurality of hybrid models having the highest ranking; and wherein selecting one of the plurality of hybrid models is further defined as selecting the one of the plurality of hybrid models determined to have the highest ranking.

17. A method, as set forth in claim 15, wherein initializing a control processor is further defined as initializing a control processor, including preloading a memory location with a plurality of hybrid models corresponding to a loading model and preloading the memory location with a plurality of hybrid models corresponding to an unloading mode;
wherein the method further comprises choosing one of the loading model and the unloading model;
wherein estimating, at one of the operating points, an amount of particulate matter accumulated in the particulate filter between the operating points for each of the plurality of hybrid models is further defined as estimating, at one of the operating points, an amount of particulate matter accumulated in the particulate filter between the operating points for each of the plurality of hybrid models corresponding to the chosen one of the loading model and the unloading model.

18. A method, as set forth in claim 17, further comprising regenerating the particulate filter when one of the plurality of hybrid models and the ranked hybrid model are determined to have reached the respective limit.

19. A method, as set forth in claim 18, wherein regenerating the particulate filter is further defined as regenerating the particulate filter for a duration to reduce the amount of particulate matter in the particulate filter.

20. A vehicle comprising:
an engine;
an exhaust system, including a particulate filter operatively connected to the engine and configured for collecting particulate matter exhausted from the engine;
a particulate estimation system configured for estimating a mass of particulate matter accumulated in the particulate filter, the particulate estimation system including:
a memory device configured for storing at least one soot estimation value and a plurality of hybrid models; and
a control processor operable for:
preloading a memory location with a plurality of hybrid models;
wherein each of the plurality of hybrid models is configured to estimate an amount of particulate matter accumulated in the particulate filter between a pair of operating points of the engine, as a function of at least one operating condition of the engine;
temporarily storing in the memory location a soot estimation value corresponding to an estimated amount of particulate matter accumulated in the particulate filter;
estimating, at one of the pair of operating points, an amount of particulate matter accumulated in the particulate filter between the pair of operating points for each of the plurality of hybrid models;
adding each of the estimated amounts of particulate matter accumulated in the particulate filter between the pair of operating points to the soot estimation values stored in the corresponding memory location for each of the plurality of hybrid models to provide a soot estimation value of a cumulative estimated amount of particulate matter contained in the particulate filter for each of the plurality of hybrid models;
selecting one of the plurality of hybrid models; and
adding the estimated amount of particulate matter accumulated in the particulate filter between the pair of operating points of the selected one of the plurality of hybrid models to the soot estimation value stored in the memory location that corresponds to a ranked hybrid model to provide a soot estimation value of a cumulative estimated amount of particulate matter contained in the particulate filter for the ranked hybrid model.

* * * * *